United States Patent
Kim et al.

(10) Patent No.: US 10,818,960 B2
(45) Date of Patent: Oct. 27, 2020

(54) LITHIUM SECONDARY BATTERY

(71) Applicant: LG Chem, Ltd., Seoul (KR)

(72) Inventors: Hyuk-Su Kim, Daejeon (KR); Ji-Yeon Kim, Daejeon (KR); Sung-Ryul Park, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/769,245

(22) PCT Filed: Feb. 27, 2017

(86) PCT No.: PCT/KR2017/002171
§ 371 (c)(1),
(2) Date: Apr. 18, 2018

(87) PCT Pub. No.: WO2017/146555
PCT Pub. Date: Aug. 31, 2017

(65) Prior Publication Data
US 2018/0309161 A1  Oct. 25, 2018

(30) Foreign Application Priority Data
Feb. 26, 2016  (KR) .......................... 10-2016-0023442

(51) Int. Cl.
*H01M 10/0525* (2010.01)
*H01M 2/16* (2006.01)
(Continued)

(52) U.S. Cl.
CPC ......... *H01M 10/0525* (2013.01); *H01M 2/16* (2013.01); *H01M 4/131* (2013.01);
(Continued)

(58) Field of Classification Search
None
See application file for complete search history.

(56) References Cited

U.S. PATENT DOCUMENTS 6,365,300 B1  4/2002 Ota et al.
2008/0199764 A1*  8/2008 Holman ................ H01M 4/621
429/61

(Continued)

FOREIGN PATENT DOCUMENTS

JP  2000340257 A  12/2000
JP  2005032670 A  2/2005
(Continued)

OTHER PUBLICATIONS

E. R. Logan etal:"A Study of the Physical Properties of Li-Ion Battery Electrolytes Containing Esters",Journal of the Electrochemical Society, Jan. 3, 2018, vol. 165, No. 2, pp. A21-A30, XP055545311.
Extended European Search Report for Application No. EP17756892 dated Jan. 31, 2019.
Mehmet Nurullah Ates et al: "A Search for the Optimum Lithium Rich Layered Metal Oxide Cathode Material for Li-Ion Batteries", Journal of the Electrochemical Society, Apr. 9, 2015, vol. 162, No. 7, pp. A1236-A1245, XP055545611.
(Continued)

*Primary Examiner* — Carmen V Lyles-Irving
(74) *Attorney, Agent, or Firm* — Lerner, David, Littenberg, Krumholz & Mentlik, LLP

(57) ABSTRACT

The present disclosure relates to a lithium secondary battery which ensures reaction uniformity even though it uses a high-loading electrode, and thus has high capacity and improved cycle characteristics. The lithium secondary battery includes: an electrode assembly including a positive electrode, a negative electrode and a separator interposed between the positive electrode and the negative electrode; an electrolyte including a lithium salt and an organic solvent; and a battery casing receiving the electrode assembly and the electrolyte, wherein the positive electrode has a loading amount of 3.5 mAh/cm$^2$ or more, the separator has an air permeability of 200-1200 sec/100 mL, and the electrolyte has a lithium ion conductivity of 11-20 mS/cm.

8 Claims, 1 Drawing Sheet

(51) Int. Cl.

| | |
|---|---|
| *H01M 10/0566* | (2010.01) |
| *H01M 4/131* | (2010.01) |
| *H01M 4/583* | (2010.01) |
| *H01M 4/66* | (2006.01) |
| *H01M 10/0567* | (2010.01) |
| *H01M 10/0569* | (2010.01) |
| *H01M 10/0568* | (2010.01) |
| *H01M 4/525* | (2010.01) |
| *H01M 4/02* | (2006.01) |
| *H01M 4/505* | (2010.01) |

(52) U.S. Cl.
CPC ........... *H01M 4/583* (2013.01); *H01M 4/661* (2013.01); *H01M 10/0566* (2013.01); *H01M 4/505* (2013.01); *H01M 4/525* (2013.01); *H01M 10/0567* (2013.01); *H01M 10/0568* (2013.01); *H01M 10/0569* (2013.01); *H01M 2004/021* (2013.01); *H01M 2004/027* (2013.01); *H01M 2004/028* (2013.01); *Y02E 60/122* (2013.01); *Y02T 10/7011* (2013.01)

(56) References Cited

U.S. PATENT DOCUMENTS

| | | | |
|---|---|---|---|
| 2009/0202915 | A1* | 8/2009 | Modeki ............... H01M 4/134 429/246 |
| 2012/0034509 | A1 | 2/2012 | Bae et al. |
| 2013/0224575 | A1 | 8/2013 | Kojima et al. |
| 2014/0356695 | A1 | 12/2014 | Abe et al. |

FOREIGN PATENT DOCUMENTS

| | | | |
|---|---|---|---|
| JP | 2014235855 | A | 12/2014 |
| KR | 20100028009 | A | 3/2010 |
| KR | 20130117355 | A | 10/2013 |
| KR | 101458468 | B1 | 11/2014 |
| KR | 20160002173 | A | 1/2016 |
| WO | 2013128559 | A1 | 9/2013 |

OTHER PUBLICATIONS

Search report from International Application No. PCT/KR2017/002171, dated Jun. 7, 2017.

* cited by examiner

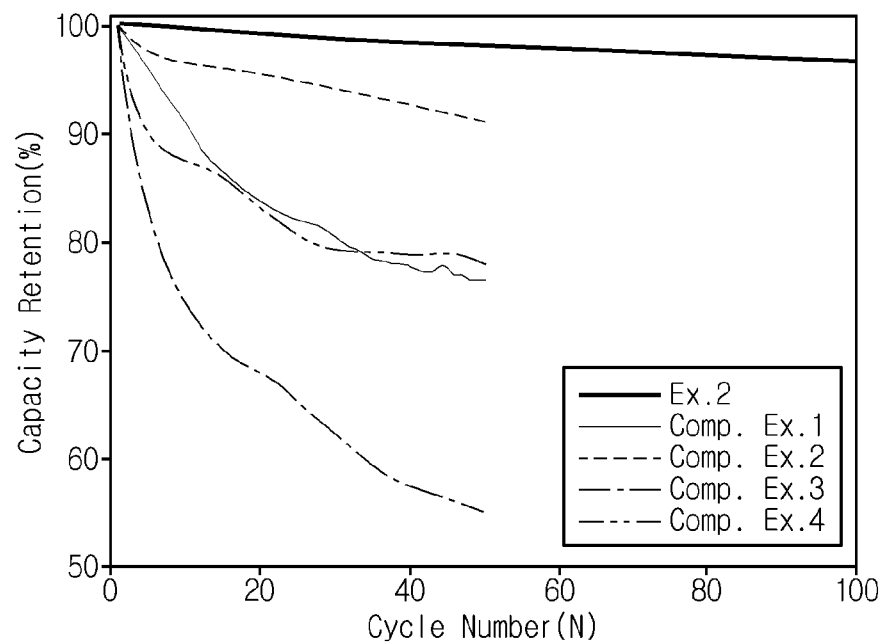

LITHIUM SECONDARY BATTERY

CROSS-REFERENCE TO RELATED APPLICATIONS

The present application is a national phase entry under 35 U.S.C. § 371 of International Application No. PCT/KR2017/002171, filed Feb. 27, 2017, which claims priority from Korean Patent Application No. 10-2016-0023442, filed Feb. 26, 2016, all of which are incorporated herein by reference.

TECHNICAL FIELD

The present disclosure relates to a lithium secondary battery. More particularly, the present disclosure relates to a lithium secondary battery having high capacity characteristics.

BACKGROUND ART

Recently, energy storage technology has been given increasing attentions. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Particularly, as electronic appliances have downsized and lightened recently, development of rechargeable secondary batteries having a compact size, low weight and high capacity has been focused.

Continuous studies about electrochemical devices have developed electrode active materials having significantly improved properties, particularly output characteristics. Among the commercially available secondary batteries, lithium secondary batteries developed in the early 1990's have been spotlighted, since they have a higher driving voltage and significantly higher energy density as compared to conventional batteries, such as Ni-MH batteries.

Such a lithium secondary battery includes a positive electrode, a negative electrode and an electrolyte. Lithium ions deintercalated from the positive electrode active material during the first charging are intercalated into the negative electrode active material, such as carbon particles, and then deintercalated again therefrom during the discharging. Such movement of lithium ions between both electrodes contributes to transport energy and allow the charge/discharge of the battery.

As technological development and a need for mobile instruments have increased, a demand for secondary batteries as energy sources has increased rapidly. Among such secondary batteries, lithium secondary batteries having high energy density and voltage, long cycle life and a low discharging rate have been commercialized and used widely. In addition, as the attention to environmental problems has increased, there has been grown the market of systems using a high-capacity battery, such as electric vehicles and hybrid electric vehicles capable of substituting for vehicles using fossil fuel, including gasoline vehicles and diesel vehicles, one of the main causes of air pollution. Under these circumstances, the base of a demand for high-capacity batteries has been extended and there is a need for designing a high-capacity electrode for manufacturing a lithium secondary battery having high energy density, high output and high discharge voltage, as a power source for the above-mentioned systems.

In the battery market, a loading amount of 3.5 mAh/cm$^2$ or more based on positive electrode is evaluated as the requirement of a high-loading electrode. The high-loading electrode generally has a thick thickness as it comprises an increased amount of an active material for the purpose of high loading. However, the thick electrode undergoes non-uniform reaction in its thickness direction, resulting in degradation of cycle characteristics.

DISCLOSURE

Technical Problem

The present disclosure is designed to solve the problems of the related art, and therefore the present disclosure is directed to providing a high-loading electrode which allows controlling the movement of a lithium ion to satisfy an adequate range, by leading to uniform electrode reaction and thus providing a lithium secondary battery with excellent cycle characteristics.

Technical Solution

The present disclosure is designed to solve the above-mentioned problems according to the related art. In one aspect of the present disclosure, there is provided a lithium secondary battery which includes: an electrode assembly including a positive electrode, a negative electrode and a separator interposed between the positive electrode and the negative electrode; an electrolyte including a lithium salt and an organic solvent; and a battery casing receiving the electrode assembly and the electrolyte, wherein the positive electrode has a loading amount of 3.5 mAh/cm$^2$ or more, the separator has an air permeability of 200-1200 sec/100 mL, and the electrolyte has a lithium ion conductivity of 11-20 mS/cm.

Preferably, the separator may have an air permeability of 250-1000 sec/100 mL, and the electrolyte may have a lithium ion conductivity of 12-19 mS/cm.

More preferably, the separator may have an air permeability of 300-800 sec/100 mL, and the electrolyte may have a lithium ion conductivity of 14-18 mS/cm.

Preferably, the separator may have a thickness of 2-50 µm.

Preferably, the separator may be a porous polymer substrate.

Preferably, the porous polymer substrate may include any one polymer selected from the group consisting of: polyethylene, polypropylene, polyethylene terephthalate, polybutylene terephthalate, polyester, polyacetal, polyamide, polycarbonate, polyamide, polycarbonate, polyimide, polyetherether ketone, polyarylether ketone, polyether imide, polyamideimide, polybenzimidazole, polyether sulfone, polyphenylene oxide, cyclic olefin copolymer, polyphenylene sulfide and polyethylene naphthalene, or a combination of two or more thereof.

Preferably, the electrolyte may have a viscosity of 1.0-3.0 cP.

Preferably, the electrolyte may further include an additive.

Preferably, the lithium salt may be any one selected from the group consisting of LiPF$_6$, LiBF$_4$, LiSbF$_6$, LiAsF$_6$, LiClO$_4$, LiN(C$_2$F$_5$SO$_2$)$_2$, LiN(CF$_3$SO$_2$)$_2$, CF$_3$SO$_3$Li and LiC(CF$_3$SO$_2$)$_3$, or a combination of two or more thereof.

Preferably, the organic solvent may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, fluoroethylene carbonate (FEC), dimethyl carbonate (DMC), diethyl carbonate (DEC), dipropyl carbonate, ethyl methyl carbonate (EMC), methyl propyl carbonate, ethyl propyl carbonate, dimethyl ether, diethyl ether, dipropyl ether, methylethyl ether, methylpropyl ether, ethylpropyl ether, methyl acetate, ethyl acetate, propyl acetate, methyl propionate, ethyl propionate, propyl propionate, γ-butryolactone, γ-valerolactone, γ-caprolactone, δ-valerolactone and ε-caprolactone, or a combination of two or more thereof.

Preferably, the positive electrode may have a thickness of 50-200 μm.

Advantageous Effects

The lithium secondary battery according to the present disclosure ensures reaction uniformity even though it uses a high-loading electrode, and thus has high capacity and improved cycle characteristics.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

The figure is a graph illustrating the results of measurement of capacity for each of the batteries prepared in Examples and Comparative Examples.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the case of a conventional high-loading electrode having a positive electrode loading amount of 3.5 mAh/cm$^2$ or more, the movement of lithium ions may be not good due to the thickness increase of the electrode, making the reaction of the electrode non-uniform in the thickness direction thereof, from which the cycle characteristics of a battery may be deteriorated. In addition, when merely the movement of lithium ions increases, lithium ions fail to be diffused into the electrode active material, so are retained and accumulated on the electrode surface.

According to the present disclosure, it has been found through experiments that when the air permeability of a separator and the lithium ion conductivity of an electrolyte are controlled to a desired range for the good movement of lithium ions in the separator and the electrolyte, lithium ions can be diffused well into the electrode active material to allow uniform reaction in the electrode, and thus to improve the cycle characteristics of a battery.

The lithium secondary battery according to the present disclosure, like the conventional lithium secondary battery, includes: an electrode assembly including a positive electrode, a negative electrode and a separator interposed between the positive electrode and the negative electrode; an electrolyte including a lithium salt and an organic solvent; and a battery casing receiving the electrode assembly and the electrolyte.

The lithium secondary battery according to the present disclosure is a high-loading battery having a positive electrode loading amount of 3.5 mAh/cm$^2$ or more. To design a high-loading electrode, the positive electrode may have a thickness of 50-200 μm.

In addition, according to the present invention, the separator is controlled to have an air permeability of 200-1200 sec/100 mL for the purpose of ensuring the movement of lithium ions satisfying an adequate range, making it allow the good diffusion of the lithium ions into the electrode active material and eventually uniform electrode reaction. When the separator has an air permeability less than 200 sec/100 mL, the movement of lithium ions increases, so the battery undergoes rapid degradation in terms of safety, and the movement rate of lithium ions in the electrode cannot keep up with the movement rate of lithium ions in the separator. When the separator has an air permeability larger than 1200 sec/100 mL, the movement of lithium ions in the separator decreases, resulting in degradation of efficiency and cycle characteristics after repeated charge/discharge procedures. Preferably, the separator may have an air permeability of 250-1000 sec/100 mL, more preferably 300-900 sec/100 mL.

In the present disclosure, the method for determining the air permeability of a separator is not particularly limited, and any conventional method in the art, such as the Gurley method according to the Japanese Industrial Standard (JIS), may be used to determine the air permeability by using Gurley type Densometer (No. 158) available from Toyoseiki Co. In other words, the air permeability of a separator may be determined by measuring the time required for 100 mL (or 100 cc) of air to pass through 1 cm$^2$ of the separator at room temperature under a pressure of 0.05 MPa.

The separator according to the present disclosure may have a thickness of 5-20 μm and a porosity of 30-60% to obtain the above-defined air permeability.

In addition, according to the present disclosure, the electrolyte is controlled to have a lithium ion conductivity of 11-20 mS/cm, for the purpose of ensuring the movement of lithium ions satisfying an adequate range, making it allow the good diffusion of the lithium ions into the electrode active material and eventually uniform electrode reaction. When the electrolyte has a lithium ion conductivity less than 11 mS/cm, it may cause the decreased movement of lithium ions in the electrode, thereby incurring non-uniform reaction on the surface and the inside of the electrode surface, from which the battery may undergo degradation of charge/discharge efficiency and cycle characteristics. When the electrolyte has a lithium ion conductivity larger than 20 mS/cm, it may cause the decreased movement of lithium ions in the separator as compared to the intercalation/deintercalation rate of the lithium ions in the positive electrode, so the negative electrode and lithium ions may be accumulated at the interface between the electrode and the separator, thereby causing side reactions with the electrolyte. Preferably, the electrolyte may have a lithium ion conductivity of 12-19 mS/cm, more preferably 14-18 mS/cm. The electrolyte can satisfy the above-defined lithium ion conductivity by adjusting the concentration of salt in the electrolyte and solvent. Further, the lithium ion conductivity may be varied on a solvent lot or a measuring instrument condition.

In the present disclosure, the method for determining lithium ion conductivity is not particularly limited, and any conventional method in the art may be used. For example, lithium ion conductivity may be determined by using a conductivity measuring instrument, such as Inlab 731.

The positive electrode includes a positive electrode current collector and a positive electrode layer formed on at least one surface of the positive electrode current collector. The negative electrode includes a negative electrode current collector and a negative electrode layer formed on at least one surface of the negative electrode current collector.

In general, the positive electrode current collector may have a thickness of 10-500 µm. The positive electrode current collector is not particularly limited, as long as it has high conductivity while not causing any chemical change in the corresponding battery. For example, it is possible to use stainless steel, aluminum, nickel, titanium, baked carbon, or aluminum or stainless steel surface treated with carbon, nickel, titanium, silver, etc. The current collector may have fine surface irregularities to increase the adhesion of the positive electrode active material thereto, and may have various shapes, such as a film, sheet, foil, net, porous body, foam, and non-woven body.

In general, the negative electrode current collector may have a thickness of 10-500 µm. The negative electrode current collector is not particularly limited, as long as it has conductivity while not causing any chemical change in the corresponding battery. For example, it is possible to use copper, stainless steel, aluminum, nickel, titanium, baked carbon, copper or stainless steel surface treated with carbon, nickel, titanium, silver, etc., aluminum-cadmium alloy, or the like. In addition, like the positive electrode current collector, the negative electrode current collector may have fine surface irregularities to reinforce the binding force of the negative electrode, and may have various shapes, such as a film, sheet, foil, net, porous body, foam, non-woven body, or the like.

The positive electrode active material may be a lithium-containing oxide, preferably a lithium-containing transition metal oxide. Particular examples of the lithium-containing transition metal oxide include any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3), or a combination of two or more thereof. The lithium-containing transition metal oxide may be coated with a metal, such as aluminum (Al), or metal oxide. In addition to such lithium-containing transition metal oxides, sulfides, selenides and halides of the lithium-containing transition metal may be used.

In general, the negative electrode active material is capable of lithium ion intercalation/deintercalation and may include lithium metal, a carbonaceous material, metal compound or a combination thereof.

Particular examples of the carbonaceous material may include both low-crystalline carbon and high-crystalline carbon. Typical examples of the low-crystalline carbon include soft carbon and hard carbon. Typical examples of the high-crystalline carbon include high-temperature baked carbon, such as natural graphite, Kish graphite, pyrolytic carbon, mesophase pitch based carbon fiber, meso-carbon microbeads, mesophase pitches, and petroleum or coal tar pitch derived cokes.

Particular examples of the metal compound include compounds containing at least one metal element, such as Si, Ge, Sn, Pb, P, Sb, Bi, Al, Ga, In, Ti, Mn, Fe, Co, Ni, Cu, Zn, Ag, Mg, Sr and Ba. Although such metal compounds may be used in any one of the forms, including simple substance, alloy, oxides ($TiO_2$, $SnO_2$, etc.), nitride, sulfide, boride and alloy with lithium, simple substance, oxides and alloy with lithium may have high capacity. Particularly, metal compounds, which contain at least one element selected from Si, Ge and Sn, especially Si and Sn, can provide a battery with higher capacity.

The separator may be a porous polymer substrate. In addition, the pore size and porosity of the porous polymer substrate are not particularly limited but may be about 0.01-50 µm and about 10-95%, respectively.

Additionally, the porous polymer substrate may include a porous coating layer containing inorganic particles and a polymer binder on at least one surface of the porous polymer substrate in order to improve the mechanical strength and to inhibit a short-circuit between the positive electrode and the negative electrode.

Non-limiting examples of the porous polymer substrate include any one selected from the group consisting of: polyethylene, polypropylene, polyethylene terephthalate, polybutylene terephthalate, polyester, polyacetal, polyamide, polycarbonate, polyamide, polycarbonate, polyimide, polyetherether ketone, polyarylether ketone, polyether imide, polyamideimide, polybenzimidazole, polyether sulfone, polyphenylene oxide, cyclic olefin copolymer, polyphenylene sulfide and polyethylene naphthalene, or a combination of two or more thereof.

The electrolyte may have a viscosity of 1.0-4.0 cP, preferably 1.0-3.0 cP at room temperature (25° C.). The electrolyte may further include an additive which may affect ion conductivity, formation of a solid electrolyte interphase (SEI) on the surface of the negative electrode, viscosity, or the like.

The lithium salt may be any one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carboxylate and lithium tetraphenylborate, or a combination of two or more thereof. According to the present disclosure, such a lithium salt may be used at a concentration of 1.0-1.5 M, preferably 1.0-1.3 M, in order for the electrolyte to satisfy the above-defined range of lithium ion conductivity.

The organic solvent may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, fluoroethylene carbonate (FEC), dimethyl carbonate (DMC), diethyl carbonate (DEC), dipropyl carbonate, ethyl methyl carbonate (EMC), methyl propyl carbonate, ethyl propyl carbonate, dimethyl ether, diethyl ether, dipropyl ether, methylethyl ether, methylpropyl ether, ethylpropyl ether, methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a combination of two or more thereof. Among them, it is preferred to use a cyclic carbonate, such as ethylene carbonate (EC), in combination with an acyclic carbonate, such as dimethyl carbonate (DMC), ethylmethyl carbonate (EMC), ethyl acetate (EA) or methyl propionate (MP). Particularly, to satisfy the above-defined range of lithium ion conductivity of electrolyte, a cyclic carbonate, such as ethylene carbonate (EC), may be used in an amount of 10-40 vol %, preferably 20-30 vol %, based on the total volume of the solvent, while an acyclic carbonate, such as dimethyl carbonate (DMC), may be used in an amount of 60-90 vol %, preferably 70-80 vol %. Particularly, in order to ensure a lithium ion conductivity of 14 mS/cm or higher, dimethyl carbonate (DMC) may be used in an amount of 50 vol % or more, or ethyl acetate (EA) or methyl propionate (MP) having high ion conductivity and low viscosity may be used in an amount of 30 vol % or more.

The additive may be at least one selected from the group consisting of sultone compounds having a carbon-carbon saturated bond in a ring, sulfate compounds having a carbon-carbon saturated bond in a ring, vinyl group-containing cyclic carbonate compounds and halogen-substituted cyclic oxalatoborate compounds. Particular examples of such additives include 1,3-propane sultone (PS), vinylene carbonate (VC), ethylene sulfate (ESA), or the like.

MODE FOR DISCLOSURE

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, 3 wt % of carbon black, 95 wt % of Li(Ni$_{1/3}$Mn$_{1/3}$CO$_{1/3}$)O$_2$ as a positive electrode active material and 2 wt % of polyvinylidene fluoride (PVdF) as a binder were mixed to form a positive electrode slurry. Next, the slurry was applied onto an aluminum foil in a loading amount of 4.5 mAh/cm$^2$ and dried in a vacuum oven at 100° C. for 10 hours or more. Then, pressing was carried out by using a roll-type press to provide a positive electrode having a thickness of 100 μm.

In addition, 1 wt % of carbon black, 96 wt % of natural graphite as a negative electrode active material, 2 wt % of styrene butadiene rubber (SBR) binder and 1 wt % of carboxymethyl cellulose (CMC) were mixed to form a negative electrode slurry. Next, the slurry was applied onto a copper foil in a loading amount of 5.4 mAh/cm$^2$ and dried in a vacuum oven at 100° C. for 10 hours or more. Then, pressing was carried out by using a roll-type press to provide a negative electrode having a thickness of 120 μm.

The negative electrode and the positive electrode obtained as described above were used, and a polyolefin separator having an air permeability of 900 sec/100 mL was interposed between the negative electrode and the positive electrolyte. Then, an electrolyte containing 1M LiPF$_6$ dissolved in ethylene carbonate (EC), dimethyl carbonate (DMC) and ethyl methyl carbonate (EMC) mixed at a volume ratio of 3:4:3, in combination with additives including 3 wt % of vinylene carbonate (VC), 0.5 wt % of 1,3-propane sultone (PS) and 1 wt % of ethylene sulfate (ESA) was injected to obtain a mono-cell having a size of 16.5 cm$^2$ based on the positive electrode. The electrolyte had a lithium ion conductivity of 13.5 S/cm.

Example 2

First, 3 wt % of carbon black, 95 wt % of Li(Ni$_{1/3}$Mn$_{1/3}$CO$_{1/3}$)O$_2$ as a positive electrode active material and 2 wt % of polyvinylidene fluoride (PVdF) as a binder were mixed to form a positive electrode slurry. Next, the slurry was applied onto an aluminum foil in a loading amount of 4.5 mAh/cm$^2$ and dried in a vacuum oven at 100° C. for 10 hours or more. Then, pressing was carried out by using a roll-type press to provide a positive electrode having a thickness of 100 μm.

In addition, 1 wt % of carbon black, 96 wt % of natural graphite as a negative electrode active material, 2 wt % of SBR binder and 1 wt % of CMC were mixed to form a negative electrode slurry. Next, the slurry was applied onto a copper foil in a loading amount of 5.4 mAh/cm$^2$ and dried in a vacuum oven at 100° C. for 10 hours more. Then, pressing was carried out by using a roll-type press to provide a negative electrode having a thickness of 120 μm.

The negative electrode and the positive electrode obtained as described above were used, and a polyolefin separator having an air permeability of 900 sec/100 mL was interposed between the negative electrode and the positive electrolyte. Then, an electrolyte containing 1M LiPF$_6$ dissolved in ethylene carbonate (EC), dimethyl carbonate (DMC) and ethyl acetate (EA) mixed at a volume ratio of 3:4:3, in combination with additives including 3 wt % of vinylene carbonate (VC), 0.5 wt % of 1,3-propane sultone (PS) and 1 wt % of ethylene sulfate (ESA) was injected to obtain a mono-cell having a size of 16.5 cm$^2$ based on the positive electrode. The electrolyte had a lithium ion conductivity of 14 S/cm.

Comparative Example 1

A mono-cell was obtained in the same manner as described in Example 1, except that the separator had an air permeability of 100 sec/100 mL, and lithium ion conductivity was controlled to 10.9 mS/cm by using an electrolyte containing 1M LiPF$_6$ dissolved in ethylene carbonate (EC), dimethyl carbonate (DMC) and ethyl methyl carbonate (EMC) mixed at a volume ratio of 3:3:4, in combination with additives including 3 wt % of vinylene carbonate (VC), 0.5 wt % of 1,3-propane sultone (PS) and 1 wt % of ethylene sulfate (ESA).

Comparative Example 2

A mono-cell was obtained in the same manner as described in Example 1, except that the separator had an air permeability of 900 sec/100 mL, and lithium ion conductivity was controlled to 10.9 mS/cm by using an electrolyte containing 1M LiPF$_6$ dissolved in ethylene carbonate (EC), dimethyl carbonate (DMC) and ethyl methyl carbonate (EMC) mixed at a volume ratio of 3:3:4, in combination with additives including 3 wt % of vinylene carbonate (VC), 0.5 wt % of 1,3-propane sultone (PS) and 1 wt % of ethylene sulfate (ESA).

Comparative Example 3

A mono-cell was obtained in the same manner as described in Example 1, except that the separator had an air permeability of 1400 sec/100 mL, and lithium ion conductivity was controlled to 16.2 mS/cm by using an electrolyte containing 1M LiPF$_6$ dissolved in ethylene carbonate (EC), dimethyl carbonate (DMC) and ethyl acetate (EA) mixed at a volume ratio of 3:3:4, in combination with additives including 3 wt % of vinylene carbonate (VC), 0.5 wt % of 1,3-propane sultone (PS) and 1 wt % of ethylene sulfate (ESA).

Comparative Example 4

A mono-cell was obtained in the same manner as described in Example 1, except that the separator had an air permeability of 1400 sec/100 mL, and lithium ion conductivity was controlled to 10.9 mS/cm by using an electrolyte containing 1M LiPF$_6$ dissolved in ethylene carbonate (EC), dimethyl carbonate (DMC) and ethyl methyl carbonate (EMC) mixed at a volume ratio of 3:3:4, in combination with additives including 3 wt % of vinylene carbonate (VC), 0.5 wt % of 1,3-propane sultone (PS) and 1 wt % of ethylene sulfate (ESA).

Test for Life Characteristics

Each of the mono-cells according to Example 2 and Comparative Examples 1-4 was determined for the capacity after repeating cycles as compared to the initial capacity under the conditions of charging at 1C, discharging at 1C and 25° C.

Referring to the Figure, it can be seen that Example using a separator having an air permeability of 200-1200 sec/100 mL and an electrolyte having a lithium ion conductivity of 11-16 mS/cm provide excellent cycle characteristics, as compared to Comparative Examples 1-4 not satisfying either or both of the above-defined physical properties.

What is claimed is:

1. A lithium secondary battery which comprises: an electrode assembly including a positive electrode, a negative electrode and a separator interposed between the positive electrode and the negative electrode; an electrolyte including a lithium salt, and additive, and an organic solvent; and a battery casing receiving the electrode assembly and the electrolyte, wherein the positive electrode has a loading amount of 4.5 mAh/cm$^2$, the separator has an air permeability of 900sec/100 mL, wherein the electrolyte has a lithium ion conductivity of 13.5-14.0 mS/cm and a viscosity of 1.0 cP to 3.0 cP at 25° C., wherein the organic solvent comprises a cyclic carbonate and an acyclic carbonate, wherein the cyclic carbonate is present in an amount of 10 vol % to 40 vol % based on the total volume of the organic solvent, wherein the acyclic carbonate is present in an amount of 60 vol % to 90 vol % based on the total volume of the organic solvent, wherein the additive includes vinylene carbonate, 1,3-propane sultone, and ethylene sulfate, and wherein the air permeability being determined by measure the time required for 100 mL of air to pass through 1 cm$^2$ of the separator at room temperature under a pressure of 0.05 MPa.

2. The lithium secondary battery according to claim 1, wherein the separator has a thickness of 2-50 μm.

3. The lithium secondary battery according to claim 1, wherein the separator is a porous polymer substrate.

4. The lithium secondary battery according to claim 3, wherein the porous polymer substrate comprises polyethylene, polypropylene, or a combination thereof.

5. The lithium secondary battery according to claim 1, wherein the lithium salt is LiPF$_6$.

6. The lithium secondary battery according to claim 1, wherein the cyclic carbonate is ethylene carbonate (EC), and wherein the acyclic carbonate is selected from the group consisting of dimethyl carbonate (DMC), ethyl methyl carbonate (EMC), and a combination thereof.

7. The lithium secondary battery according to claim 1, wherein the positive electrode has a thickness of 100μm.

8. The lithium secondary battery according to claim 6, wherein the organic solvent further comprises ethyl acetate.

* * * * *